F. FITZ-TARR BINGHAM.
MOTOR CYCLE.
APPLICATION FILED MAR. 18, 1908.
971,166.
Patented Sept. 27, 1910.
9 SHEETS—SHEET 1.
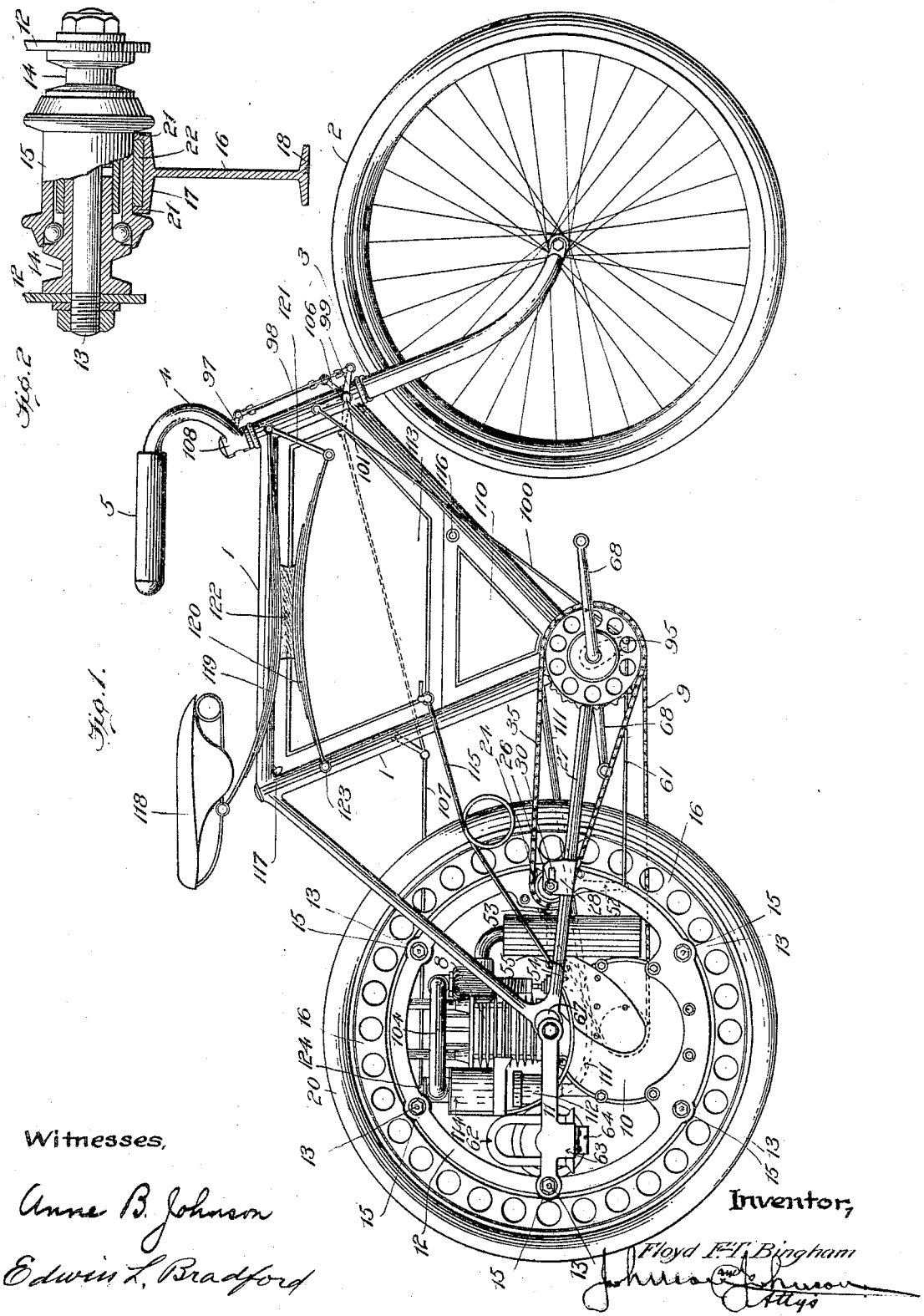
Witnesses,
Anne B. Johnson
Edwin L. Bradford
Inventor,
Floyd F.T. Bingham F. FITZ-TARR BINGHAM.
MOTOR CYCLE.
APPLICATION FILED MAR. 18, 1908.
971,166.
Patented Sept. 27, 1910.
9 SHEETS—SHEET 2.
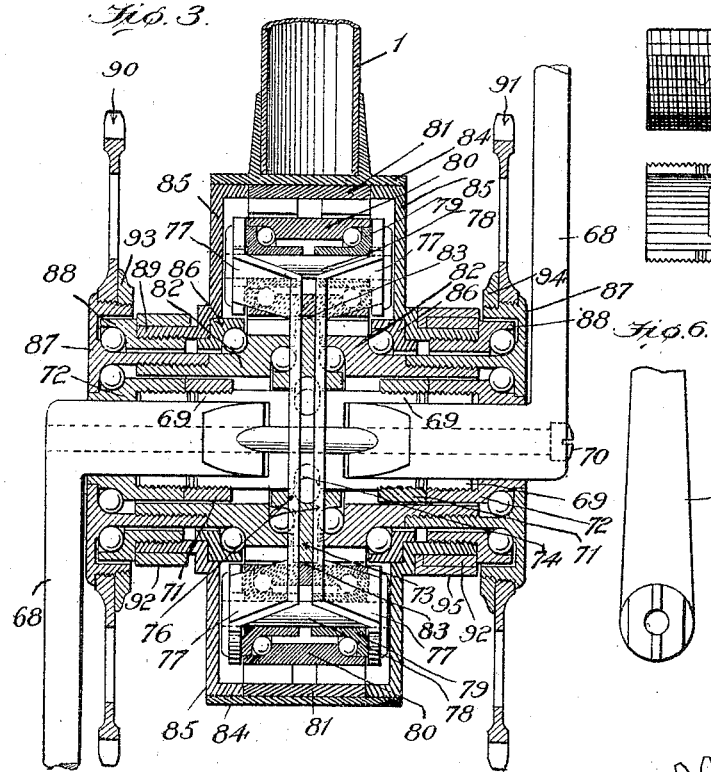
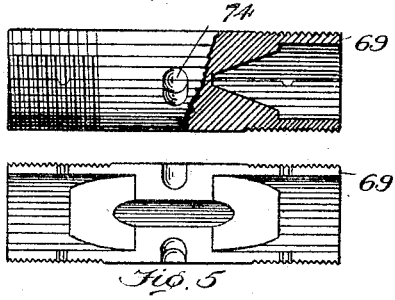
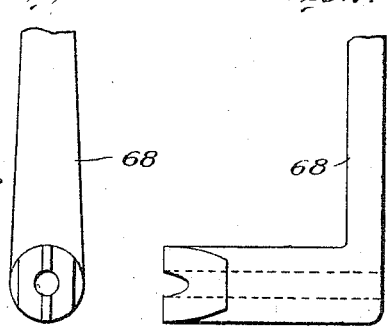
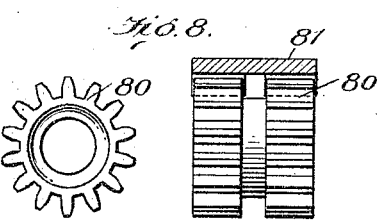
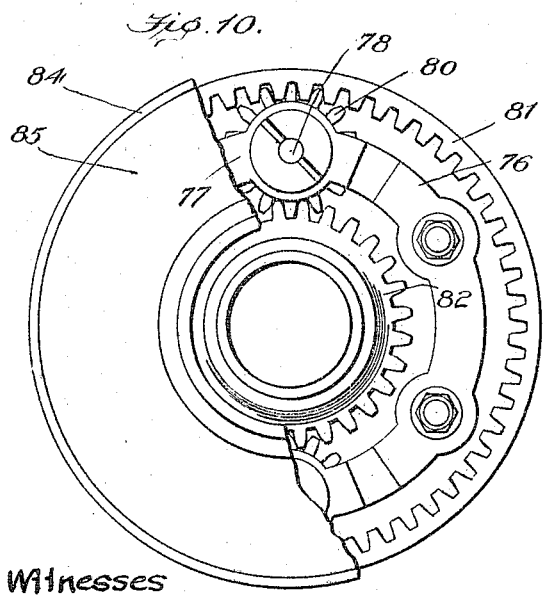
Witnesses
Anne B. Johnson
Edwin L. Bradford
Inventor,
Floyd F-T Bingham
Johnson & Johnson
Attorneys.

F. FITZ-TARR BINGHAM.
MOTOR CYCLE.
APPLICATION FILED MAR. 18, 1908.
971,166.
Patented Sept. 27, 1910.
9 SHEETS—SHEET 3.
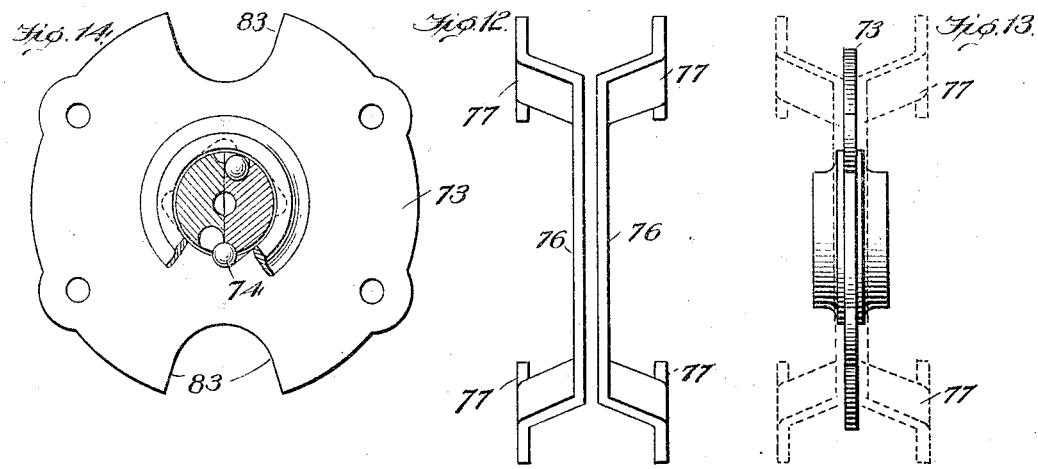
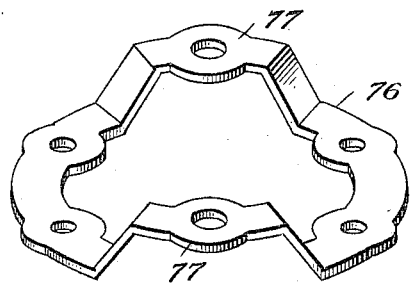
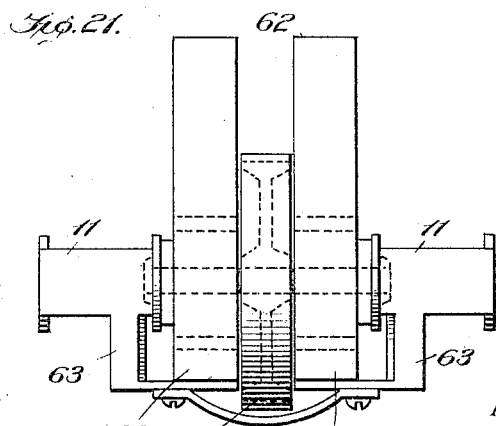
WITNESSES
Anne B. Johnson
Edwin L. Bradford
INVENTOR
Floyd F-T. Bingham
Johnson & Johnson
Attorneys

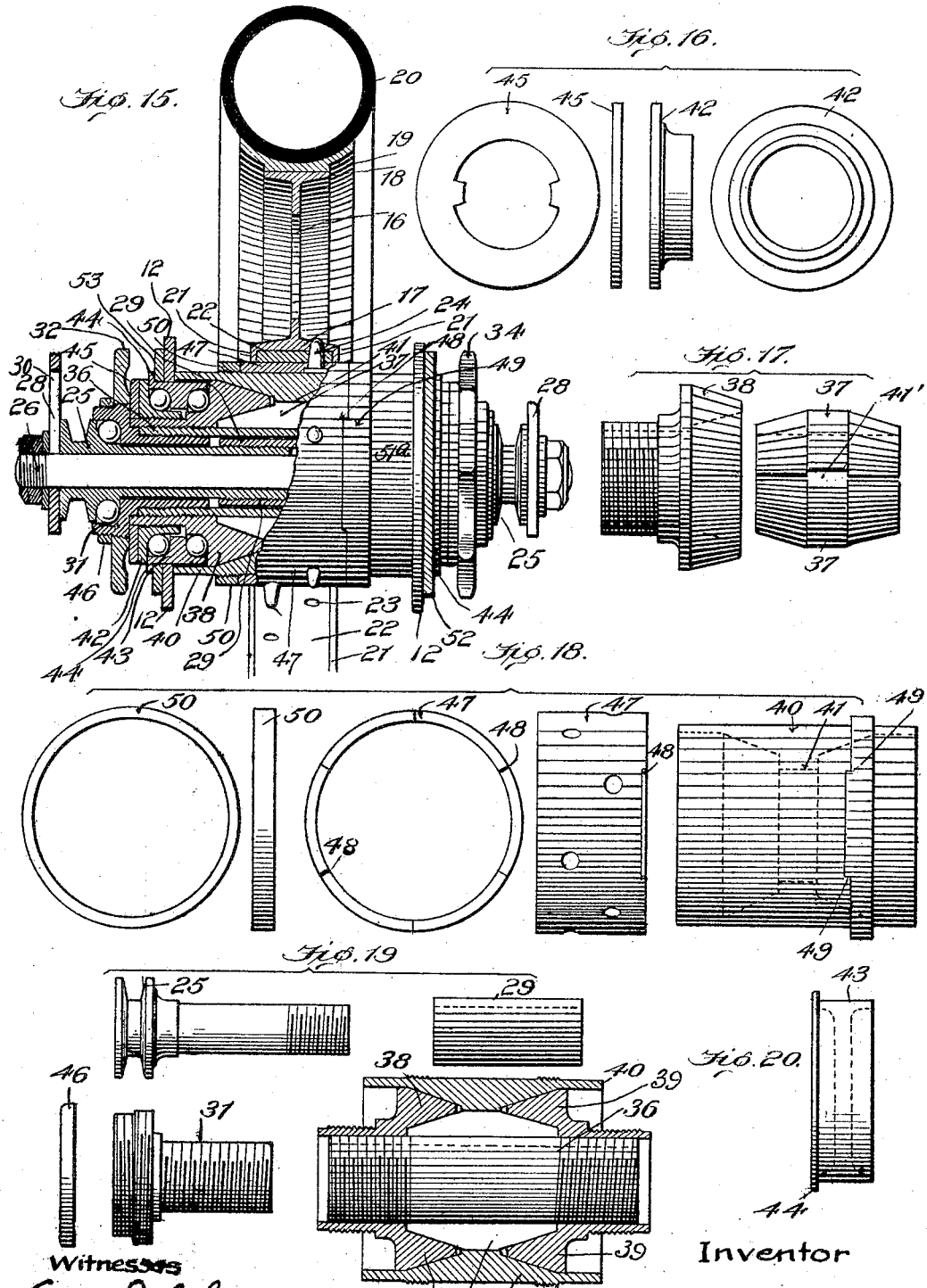

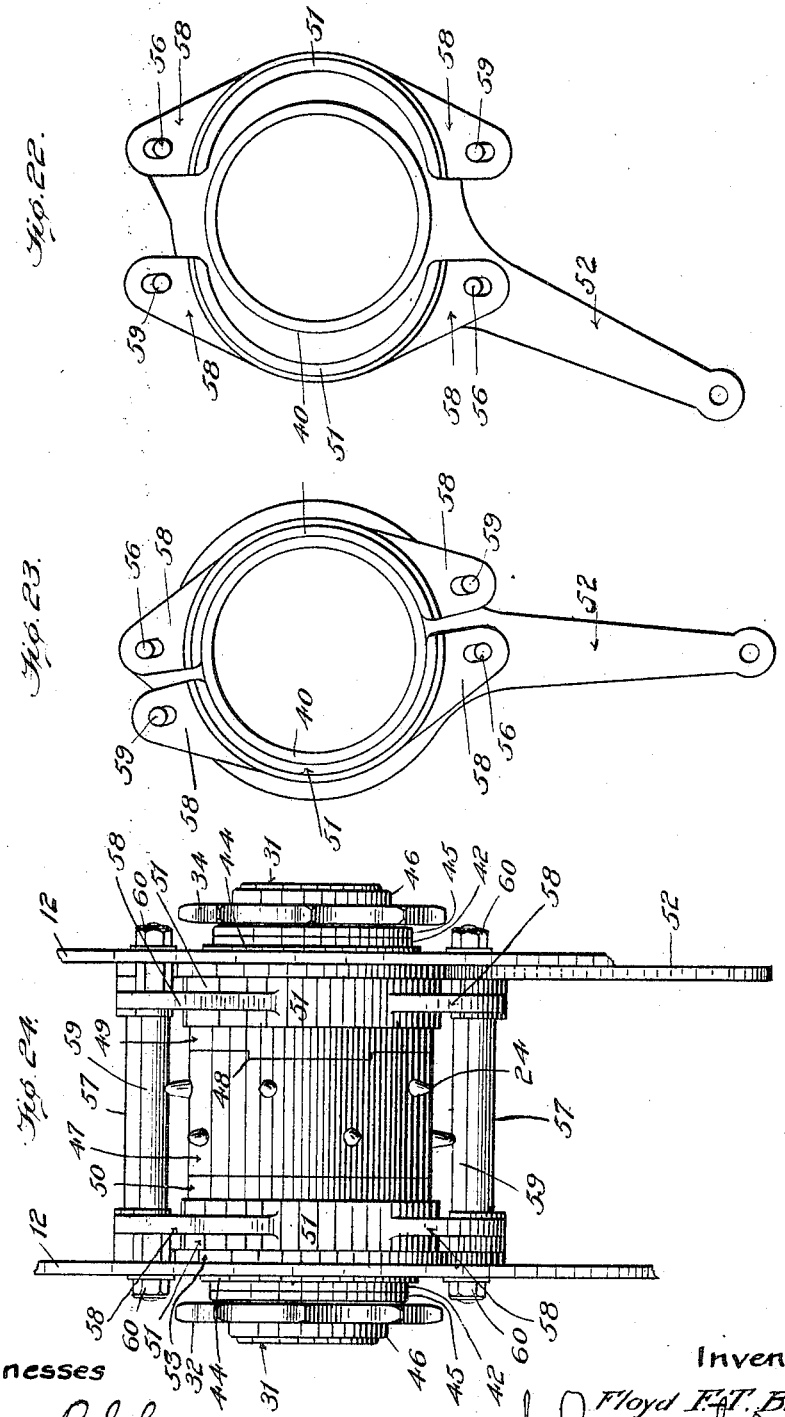

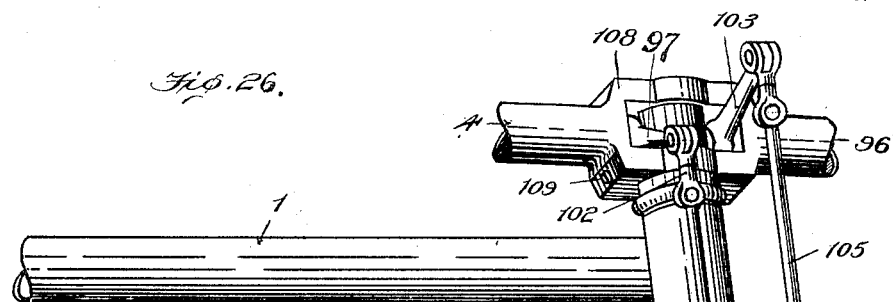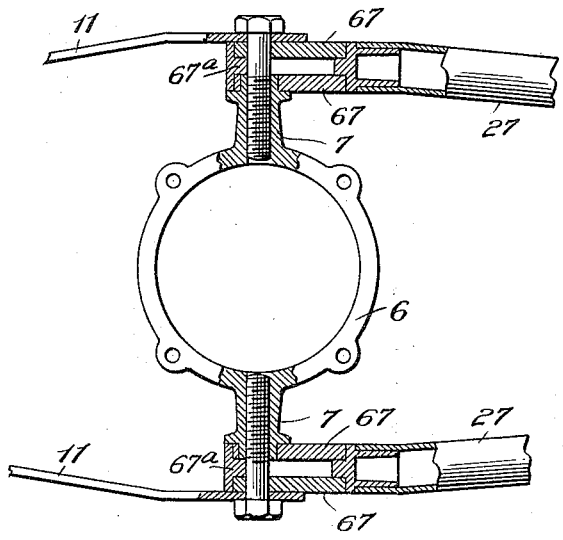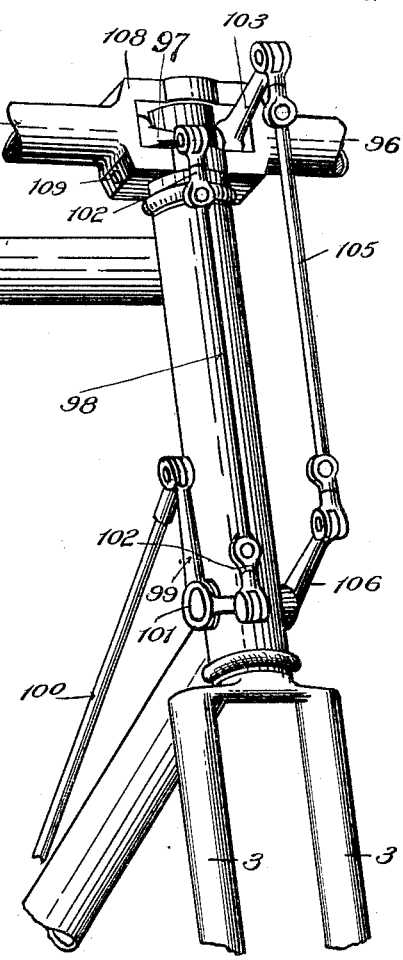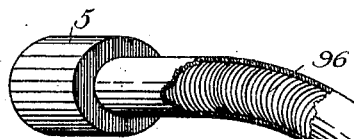

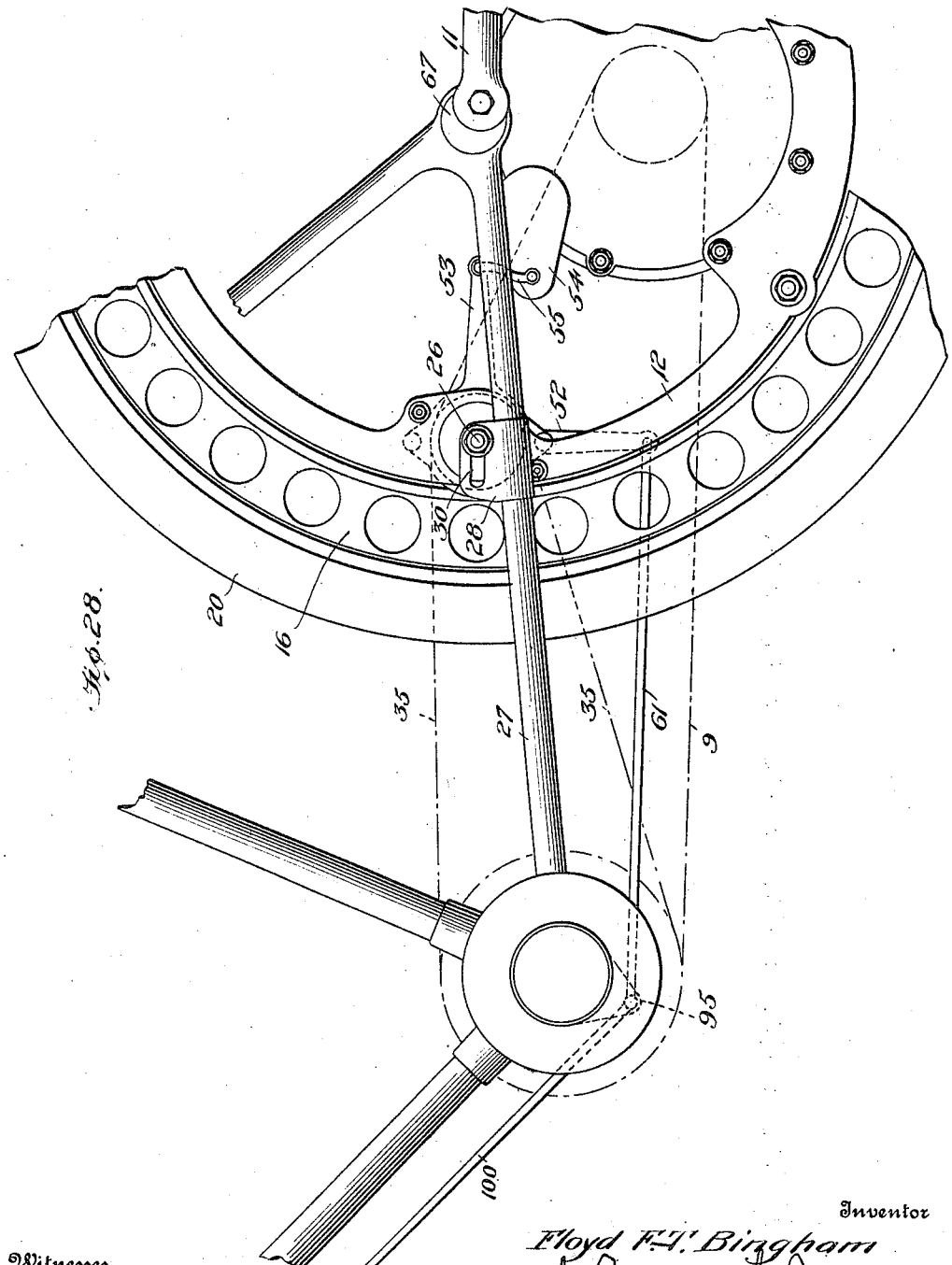

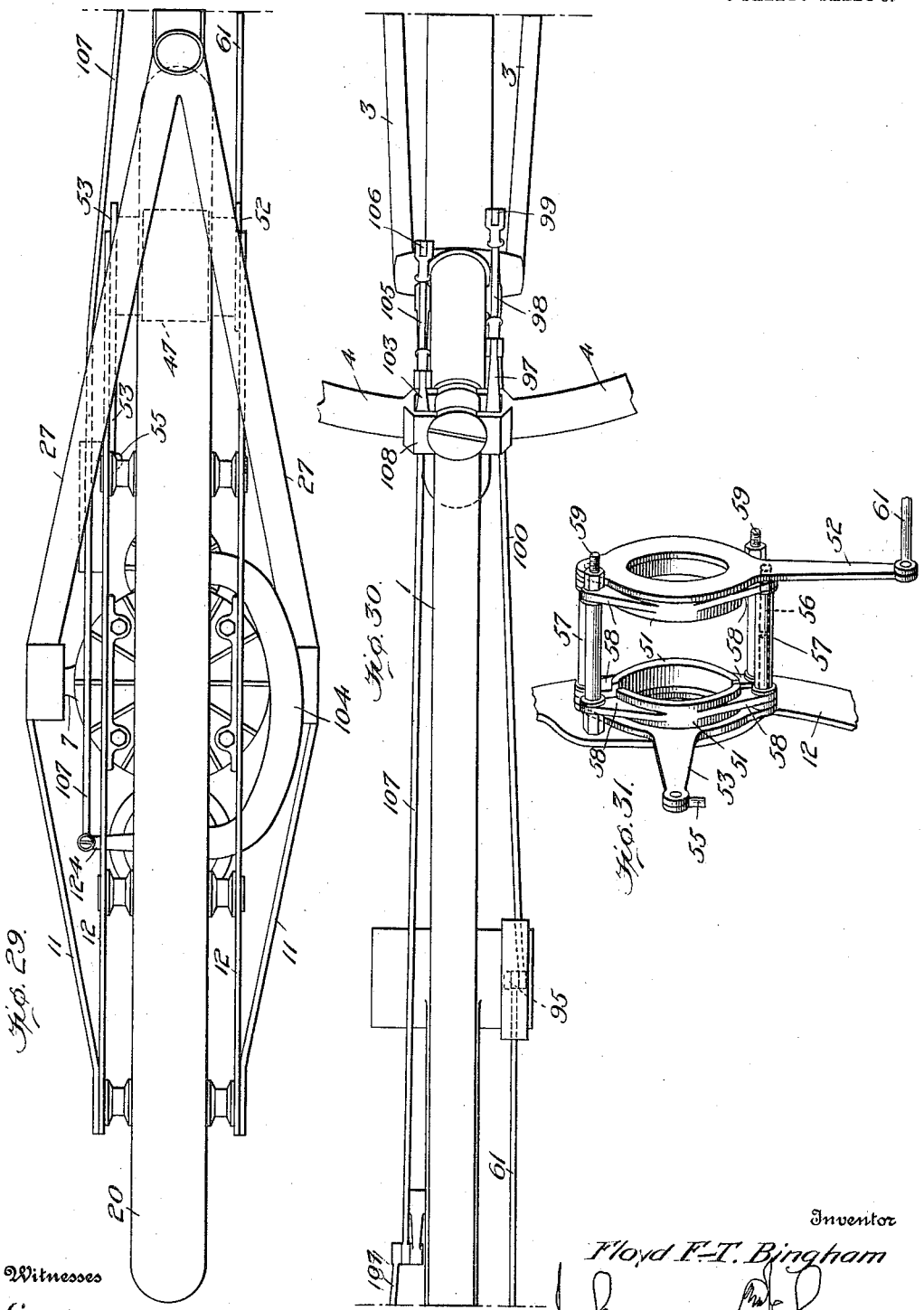

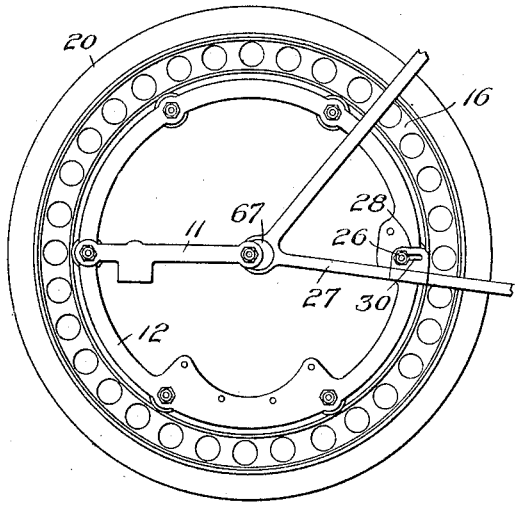
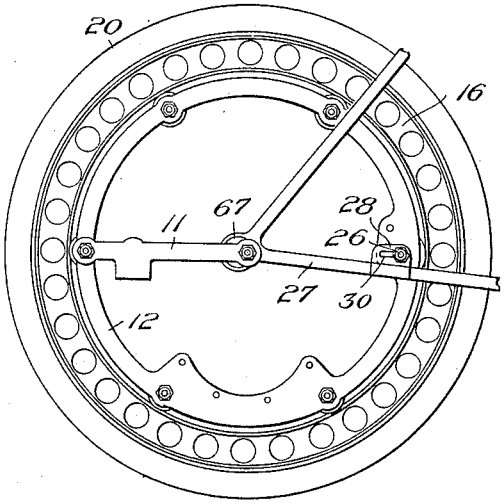
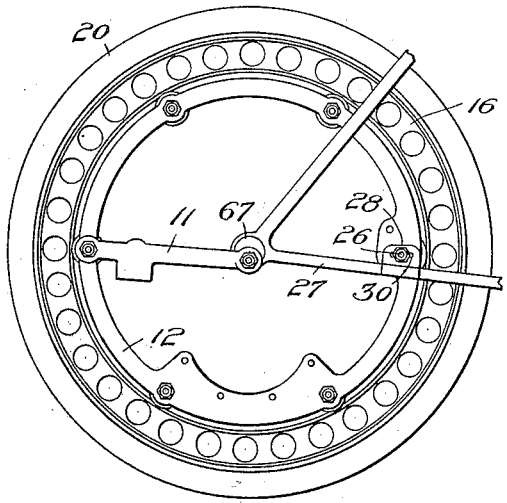
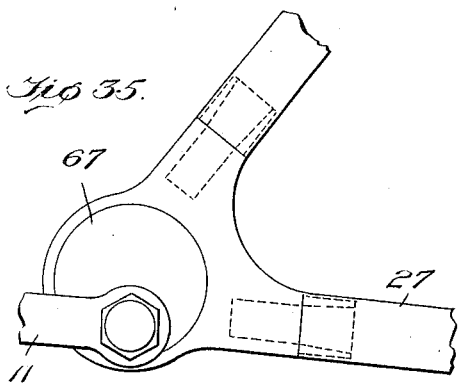
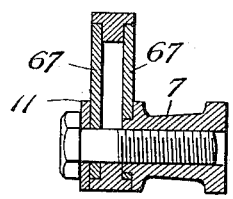

UNITED STATES PATENT OFFICE.

FLOYD FITZ-TARR BINGHAM, OF SAN JOSE, CALIFORNIA.

MOTOR-CYCLE.

971,166.  Specification of Letters Patent.  Patented Sept. 27, 1910.

Application filed March 18, 1908. Serial No. 421,780.

*To all whom it may concern:*

Be it known that I, FLOYD FITZ-TARR BINGHAM, a citizen of the United States, residing at San Jose, in the county of Santa Clara and State of California, have invented certain new and useful Improvements in Motor-Cycles; and I do hereby declare the following to be a full, clear, and exact description of the invention, such as will enable others skilled in the art to which it appertains to make and use the same.

My invention relates to what are known as motor cycles, or that class of bicycles in which power can be applied manually, as through pedals, or mechanically, as from a motor, gasolene or otherwise.

My invention embodies in a novel manner all the elements of the driving mechanism within the traction wheel and includes in combination with a motor a friction driving roller of novel construction and function and having a brake mechanism and arranged so that in its driving function the wheel will be free of the weight of the motor, its support, and its operating connections with the resulting advantage of a free starting and driving power, and in the claims appended hereto I will set out the parts and combinations and arrangement thereof wherein my invention resides. In the organization of my new motor cycle I prefer to use what is known as the diamond frame with pedals at the lower corner or angle, and provide the rear end of said frame with a substantially circular yoke between and constituting a rigid part of the rear arms of the frame, and around which the traction wheel is rotated by a driving-roller mounted within said wheel and adapted to be actuated by either the motor or the pedals.

An embodiment of the invention is shown in the accompanying drawings in which—

Figure 1 is a side elevation of a motor cycle embodying my invention. Fig. 2 is an elevation partly in section, of one of the rear wheel supporting rollers and a section of the wheel rim. Fig. 3 is an axial sectional view of the pedal driving mechanism. Fig. 4 is an elevation partly in section, of the two part clutch sleeve for the pedal shaft. Fig. 5 is a plan of one of said clutch parts. Figs. 6 and 7 are broken end view and elevation, respectively of the pedal shaft. Fig. 8 shows side and end views respectively of one of the duplex speed multiplying gearing, and a section of the geared rim of the treadle casing. Fig. 9 is a similar view of one of the duplex central pinions of said casing. Fig. 10 is an elevation of the portion of the pedal mechanism for holding the multiplying gearing and its yoke, the screw threaded cap thereof being partly broken away to expose the gearing. Fig. 11 is a perspective view of one of the pinion twin carriers of the pedal mechanism. Fig. 12 is an edge view of the twine carrier of the pedal mechanism. Fig. 13 is an edge view of the clutch-plate for the twin carriers which are shown in dotted lines in position with the clutch. Fig. 14 showns in side view the clutch-plate and the pedal shaft in section, the central portion of the clutch-plate being broken away. Fig. 15 is a partial axial section of the toothed driving roller and a portion of the pneumatic wheel tire in section, the roller parts including the toothed connection with the wheel-web being partly in section. In this figure the brakes 51 are removed from the plain surfaces 51ᵃ on each end of the roller shell 40. Figs. 16, 17, 18, 19 and 20 are detail views in elevation of the parts in groups of the driving roller shown in Fig. 15 in section. Fig. 21 shows in rear end elevation the magneto generator of the motor. Fig. 22 shows in elevation a pair of brakes and the wrist-lever to which they are pivotally connected and by which they are applied to and released from the driving-roller, the brakes being in their released positions in relation to the roller-shell. Fig. 23 is a like view—the brakes being in the positions they occupy when applied to the roller-shell. Fig. 24 is a side elevation of the toothed driving roller and its attached brake mechanism. Fig. 25 is a top view partly in horizontal section of the supporting yoke for the motor cylinder and part of the wheel supported frame. Fig. 26 is a broken perspective view of the head and fork of the frame and the handle parts connected therewith. Fig. 27 is a view partly in longitudinal section of the handle-bars. Fig. 28 shows in elevation the sparking operating connections. Fig. 29 shows in top view the rear portion of the motor cycle, the rod 107 and its connected arm 124 for operating the fuel-supply 104 on one side of the frame and the rod 61, on the other side of the frame connected to the lever 52 for operating the brakes. Fig. 30 shows in top view the front portion of the motor cycle, the rod 107 and its connections with the bell-crank levers of the steering-fork, for operating the fuel-supply arm 124, and the rods 61—100, and their connections with the bell-crank levers of the steering-fork for operating the brake-lever 52. Fig. 31 shows in perspective the brake-device with its two pairs of brakes, their operating levers 52—53 and their tie-bar connections 59, and the link-connection 55 of the lever 53 for controlling the sparking-device, the brakes being in their closed position. Fig. 32 shows the driven-wheel and the means for adjusting it to the position shown in Fig. 1 which is its extreme rearward position. Fig. 33 is an identical view showing the wheel in its extreme forward adjustment. Fig. 34 is an identical view showing the wheel in its adjustment mediately of its rearward and forward extremes. Fig. 35 shows in side view the eccentric and its connection with the frame-arms. Fig. 36 shows a vertical section of the same.

Referring more particularly to the drawings, 1 indicates the frame which is preferably of substantially the usual diamond shape, at the forward end of which the front wheel 2 is mounted by means of the fork 3. Handles 4 are secured to the head of the fork for steering the machine and the grips 5, or hand holds are rotatably mounted on the ends thereof for actuating the mechanism that controls the motive power and will be hereinafter more fully explained. A motor support, preferably in the form of an annular plate or yoke 6, Fig. 25, is rigidly secured between the rear ends 27 of the frame by means of fastening bolts which pass through the frame ends and eccentric disks 67 and into screw-threaded socketed projections 7 upon diametrically opposite points of the yoke. A motor 8 of any suitable construction is mounted on the yoke and transmits its power through the sprocket and chain 9 to the driving roller, the weight of the motor being thereby placed so low that it assists in balancing the machine.

Secured to the bottom of the crank case 10, and to the lower side arms of the wheel supported frame, and also between the two braces 11, are two annular plates or rings 12, one at each side of the rear wheel, and around and upon roller bearings in said rings the rear wheel is caused to revolve. Arranged at suitable distances around the rings are bolts 13, Figs. 1, 2 and 15, five being shown in the drawings, upon which are mounted the hollow axles 14, Fig. 2, for supporting the flanged rollers 15. These rollers engage frictionally with and support the supplementary rim 16 of the wheel. The rollers preferably run on ball bearings and their cup flanges form guards for preventing the wheel from moving laterally or sidewise out of the groove formed by and between them.

The supplementary wheel rim is formed by an annular web 16, Figs. 1, 2 and 15, preferably perforated to decrease its weight, and provided upon its inner and outer edges respectively, with flanges 17 and 18, the outer flange being provided with the usual rim 19 Fig. 15, for the reception of the tire 20. The inner flange is preferably provided with side flanges 21, Fig. 15, between which is placed a strip or band 22 of compressed or indurated fiber. The band and flange 17 are provided with registering perforations 23, Fig. 15, through which spurs or projections 24, on the driving roller band 47 extend for connecting the web flange and said wear band for propelling the machine said wear band serving also to reduce the noise produced by the roller bearings and the driving-roller.

The driving-roller Fig. 15 is mounted on an axle or bolt 26 and a sleeve 25 on each end of the bolt, the inner end of each sleeve being externally screw-threaded and coupled together by an interior screw-threaded union bushing 29 the outer ends of said sleeves terminating each in a ball-bearing and a shouldered end which abuts against clips 28—28 to which the sleeves are fastened by a nut on the outer end of the bolt.

Upon the ball-bearing end of each sleeve 25 is loosely fitted a shorter sleeve 31 its outer end formed with a ball-bearing overhanging the ball-bearing of the sleeve 25 forming the counterpart thereof the sleeve end having an external screw thread; and upon these two shorter sleeves 31, is screwed a union sleeve 36. Upon the outer end of each union sleeve 36, is screwed a cone 38—39 the points of the cones being toward each other and overhanging the union sleeve 36. A friction drum 37 is loosely fitted upon the middle nonthreaded part of the union sleeve 36 and has a double conical form corresponding with the overhanging inner ends of the cones, and upon the outer surfaces, of the cones is fitted a shell 40, the inner side of which has a double conical form corresponding with and conforming to the outer surfaces of the cones. The outer end of each cone has a shell form which is screw threaded both internally and externally and at the base or outer end of the cone the shell end is provided with ball-bearing cups 42—43, the cup 42 being of L shape in cross section and the cup 43, being of T shape in cross section and set upon the balls and the cup 42 screwed upon the outer screw surface of the outer end of the cone, thereby holding the bearing balls in their seats. A washer 45 is placed between the shouldered cup end of sleeve 31 and the outer side of cup 42 and against this washer the sprocket wheel 32 is screwed upon the shouldered end of the sleeve 31, upon which the ring lock-nut 46 is screwed to bind the sleeves 31—36, the cones the ball-bearing cups 42—43 and the sprocket wheels together as a rotatable entirety.

Mounted upon the shell 40 is a perforated band 47 Figs. 15 and 18 provided with spurs 24 which preferably project through openings in the band into and through corresponding perforations in the wear-straps 22 and into and through openings in the web flange 17 of the wheel, whereby the roller is locked to the wheel, while the perforated band is locked to the shell 40 by means of shoulders 48 on the edge of said band adapted to engage correspondingly shouldered projections 49 on the periphery of the shell, whereby the roller is positively driven by means of the sprocket-wheel 32 which is driven by the motor through the chain 9, which also extends to and connects with the treadle sprocket 90.

The sprocket-wheel 34 is screwed upon the shouldered end of the other sleeve 31 corresponding to the sprocket wheel 32 and is actuated by a chain 35 connecting said sleeve with the treadle-sprocket 90, so that while the roller is rotated by the motor through the chain 9, it may be also rotated by the joint action of the sprocket wheels 32 and 34. The roller driving-axle or bolt is mounted at its ends upon the side arms 27 of the frame by means of a pair of clips 28. To complete the connection of the roller members so that it may be driven as an entirety, the friction drum 37 is formed of two segmental sections and at the split has diametric recesses 41' Fig. 17, into which projections 41, on the interior of the shell 40, engage and thereby lock the shell members together; while the function of the cones serves to give an expanding pressure to the impinging members 37—40 the inner member 37 upon the union sleeve 36, and the outer member 40 upon the inner wall of the perforated band and thereby the desired pressure or friction between the shell members is maintained. It is this construction which, while causing the positive rotation of the traction wheel by the toothed engagement of the band 47 with the web of the wheel, allows the sprocket driven cones to be started by a slipping movement in contact with and between the shell members 37 and 40, to counteract the effect of the sudden starting acting on the driving roller upon the wheel. It is this construction which provides the slightly yielding frictional function of the cone members of the roller which will prevent damage to the wheel mounting parts from the sudden starting of the motor. In this operation it will be understood that the positive driving engagement with and function of the roller with the traction wheel, will be unimpaired and the efficiency of the driving function of the roller will be maintained with the desired speed.

The friction drum 37, Fig. 17, surrounds the central portion of sleeve 36 and is held in engagement therewith by two adjustable friction cones 38 and 39 better shown in Fig. 19. The drum is preferably formed from segmental sections and the ends are beveled or inclined so as to be engaged by the inner surfaces of the cones. An interiorly beveled friction shell 40 Figs. 18 and 19, surrounds the two cones and the drum 37 and engages positively with the latter by means of internal projections 41, which fit in corresponding recesses 41' Fig. 17, in the periphery of the central portion of the friction drum. Between the outer ends of the friction cones 38, 39 and the outer ends of the cone shells 31 are formed ball bearing cones and cups 42 and 43, respectively the outer edge of each of the cups being provided with a flange 44, which engages with the rings 12, and assists in holding the roller in position.

After the cones have been adjusted between the friction drum 37 and the shell 40 to secure the desired pressure or friction between the surfaces of the cones and the surfaces of the drum and shell, the cones are held in position by the feathered washers 45 Figs. 15 and 16, which fit between the sprocket wheels and the cones 42, the sprocket wheels being secured against displacement by the lock-nuts 46. It will be noted referring to Fig. 15, that the sparking-lever 53 is fitted to swing loosely upon the ball-bearing cup 43 between the ring-frame 12 and the shoulder 44 of the ball bearing cup 43 and is thereby kept in vertical position. It will also be noted that the band-spurs 24 are preferably formed with heads so as to fit the perforations in the band and are thereby rendered removable so that in case of wear or breakage they may be replaced; and that the band 47 is maintained by its shoulders 48 in locking engagement with the shell 40, by a ring-nut 50, so as to be positively rotated by the shell.

The operation of the frictionally yielding mechanism by which damage to the roller parts and their connections is avoided is as follows: The fixed members of the roller are the bolt or shaft 26; the ball bearing sleeves 25, 25, which are connected by the bushing 29 and fastened to the clips 28—28, and the ball-bearing cups 43—43 which are secured to the ring-frames 12 which are fixed parts of the main frame.

The rotating elements and their functions are as follows: The friction cone 38 is screwed externally on the bushing 36 at one end and inserted into the shell 40 which has a wide double beveled surface; next is inserted the segmental double beveled friction bushing 37 which is keyed at four points to the shell 40; next is screwed on the friction cone 39 externally at the other end of the bushing 36. Now, screwing up the cones 38—39 simultaneously will cause them to wedge or crowd into the sloping surfaces of shell 40 and upon bushing 37 which, will in turn, bind sufficiently for a certain amount of slippage upon bushing 36 forming thereby a frictional connection through the ball-bearing sleeves 31—31 to the driving-roller sprocket wheels 32 and 34. When the motor is operating after having been started manually a series of sudden impulses and jerks will transmit themselves, respectively in succession from the motor sprocket to the chain 9 which passes over and drives the sprocket wheel 32, to the crank sprocket wheel 90, through the crank mechanism, to the crank sprocket wheel 91, chain 35, driving-roller sprocket wheel 34, ball-bearing sleeves 31—31 and bushing 36, and finally to the friction cones 38 and 39, causing them to rotate in a jerky manner and gradually impart full frictional hold to the sloping surfaces of the shell 40 as the motor gains headway at about half speed.

The ball bearing cups 42 and double cups 43, are necessary to give free rotative play to accommodate the jerky power transmissions. When the motor cycle attains full speed and the motor is running smoothly, all rotary parts in the driving-roller will revolve in unison because complete frictional hold is attained automatically.

A brake is provided for the driving-roller and consists of two pairs of semi-circular brake members 51—51 Figs. 22—23—24 and 31, which encircle the plain surfaces 51ª of each end of the roller-shell 40 as seen in Fig. 15 and are operated by a wrist-lever 52 which is loosely mounted on the upper fixed tie-bar and fits between one end of said roller and one of the fixed rings 12 which support the wheel. The rings are rigidly connected by a pair of nutted tie-bars 59—59 and on one of these tie-bars the upper end of one of the levers 52 is loosely mounted, the lower end of said brake being pivoted by an ear 58 to the lever by a wrist-pin 56 fixed thereon. The other brake is loosely mounted its lower end to the other tie-bar 59, the upper end of this brake being pivotally mounted by an ear 58 on a wrist-pin 56 fixed on the lever. The fixed tie-bars are therefore, diagonally on opposite sides of the roller and the wrist-pin of each strap is opposite one of the tie-bars and each is movable with the lever. By this construction it is evident that when the lever 52 is moved forward by its connected rod 61, both brakes will be simultaneously closed and set upon the roller-shell 40 to check and stop the speed of the machine as in Fig. 23.

In this movement of the lever the upper wrist-pin of one of the brakes will be moved toward the fixed tie-bar and the lower end of the other brake will be moved in the opposite direction toward the other fixed tie-bar. The opposite movement of the lever causes the brakes to be opened releasing the brake. An identical pair of brakes 51—51 is fitted upon the opposite end of the roller as in Figs. 24 and 29, and each brake is connected in an identical manner to the same tie-bars and pivotally connected to wrist-pins 56—56 on a lever 53, which is loosely mounted on the other lower fixed tie-bar 59 between the other end of the driving-roller and the other fixed ring 12 and has wrist-pins 56 opposite lengthwise of the roller, those on the brake-lever 52. To effect the simultaneous operation of these separate and distinct brake-devices on the opposite ends of the driving-roller I provide the following means. The levers 52 and 53 are connected together by their respective wrist-pins 56—56 which are connected by a sleeve 57 Fig. 31, the pins being within the sleeve and braced together, the upper and the lower pairs of wrist-pins being separately connected by such a sleeve 57. The ends of these sleeves are shouldered and fit against the inner walls of the levers Fig. 24 and rigidly connect the wrist-pins and cause them to form rigid connections for the levers so that the movement of the lever 52 will simultaneously and to the same extent, move the lever 53 and thus cause the two pairs of brakes to be applied and released, the levers for this purpose being swung upon the roller, and the brakes each upon its respective fixed tie-bar. To render uniform the grip of the brakes upon the driving-roller, their ears 58, have each a slot whereby the brakes are adapted for self adjustment upon their respective tie-bars and wrist-pins, while the tie-bars and their fastening nuts 60, serve to bind the ears of the brake and the shouldered sleeves together and thereby give firmness to the connected levers and render them movable together with a firm brake function upon the roller.

In addition to the brake function of the lever 53, I utilize it as the means for controlling the sparking mechanism 54 in a well known manner through a link connection 55 Fig. 28, with said lever and other suitable mechanism which is not shown as it forms no part of the invention. The important matter of this double use of the brake-lever 53 is, that the same means by which both pairs of brakes are set to check or stop the speed of the machine, are caused to operate at the same time to disconnect the sparking-device of the motor to stop its action. When the same means are operated to release the brakes the sparking-device will be again thrown into action and this so far as I know and can find is broadly new. In this operation the movement of the lever 52 rearward will cause the brakes to be opened to release the brakes, and the lever 53 will thereby be simultaneously moved upward to actuate the sparking-device to operate the motor, while the forward movement of the lever 52 will cause the brakes to be closed upon the roller and at the same time and by the same lever movement cause the lever 53 to be forced downward throwing the sparking-device out of action and stopping the motor. This construction provides controlling means for the motor and its sparking mechanism with coöperating means for controlling the brake by the steering-handle of a motor driven vehicle, whereby the relation of these co-acting elements gives the advantage of simultaneous operation of the motor and of the brake controlling mechanism and at the same time gives the rider control in the guiding of the cycle, one of the handle-bars for this purpose being directly and positively connected to the motor and to the brake controlling devices, so that the partial rotation of one of the handle-bars causes the simultaneous action of the motor, its sparking-device and the brake devices in controlling the movement of the cycle; while the partial rotation of the other handle-bar gives the rider control of the oil supply to the motor.

The arrangement and connections of the rods 61 and 107, provide a very effective control of the machine, and for this purpose the brake-operating lever 52 depends from one end of the driving-roller so as to connect with its operating rod 61 below the treadle-shaft from which it is supported by a depending swing arm 95 at one side of the frame; while the lever 53 stands horizontally rearward from the other end of the driving-roller in convenient position to be connected by the depending link 55, with the sparking-device, so that the rider, by means of one of the handle-grip connections with the rod 61 has control over the brake and over the sparking-device. The other handle-grip by its connections with the rod 107, at the other side of the frame, gives the rider control over the fuel-supply.

The importance of providing the driving-roller with the brakes is that it causes the power to control the speed of the machine to be applied direct to the inner web of the traction wheel and thereby effect the quick stopping of the machine.

The sparking apparatus which may be located at 54 within the wheel, may be of any well known character but I prefer to use one that is adapted to be energized by magneto mechanism 62, Figs. 1 and 21, that is mounted at the side of the motor upon downwardly and inwardly extending lips or extensions 63 on the braces 11, which brace extensions are joined together by a curved brace 64.

Power can be transmitted to the driving roller by the rider through the pedal mechanism which consists of the usual crank, preferably formed of two similar crank arms 68, Figs. 3, 6 and 7, which have their inner ends tapered wedge-shape and are held in a clutch sleeve 69, Figs. 3 and 4, by a bolt 70, tapped into the crank-arms, the sleeve being preferably divided longitudinally and held together by two screw collars 71 and the cone bearings 72 at its ends.

Mounted upon the central portion of the clutch sleeve 69 is a clutch plate 73 which is adapted to be rotatably connected with the sleeve by pawl and ratchet mechanism, preferably balls 74, Fig. 14, which fit in inclined recesses formed in the sleeve and the plate respectively.

Rigidly secured to the outer edge of the clutch-plate 73, are two annular frames 76, Figs. 3, 11 and 12, the diametrically opposite edge parts of which are bent outward or away from each other as shown at 77, and perforated for bolts 78, Figs. 3 and 10, upon which are seated ball-bearing cones 79. Rotatably mounted on each pair of cones by ball-bearings is a duplex sleeve-like pinion 80, Figs. 8 and 10, which is adapted to engage with an internally duplex geared annular rim 81 on one side and with two central pinions 82, Figs. 3, 9 and 10, on the other, the clutch-plate being recessed as at 83 for the pinions 80. The annular cogged rim 81 is rigidly secured within a surrounding seat or shell 84, of the frame 1 by two exteriorly screw threaded caps 85, and the central pinions 82 are rotatably mounted between the hub of the clutch-plate 73 and the caps 85 by means of the ordinary ball-bearing cups 86. A sprocket cap 87, Fig. 3, is rigidly secured upon the outer end of the hub of each of the pinions 82 and is supported by ball-bearings between the cones 72 and cups 88 that are secured to the flanges 89 on the inner edges of the cap screw 85. Sprocket wheels 90 and 91 are secured to the peripheries of the caps 87 by nut locks 93 and 94. By arranging the wheel rim and pinions in this manner and making the pinions 80 only half the diameter of the pinion 82 the sprocket wheels will be caused to rotate three times for every rotation of the pedal shaft, thereby giving three times the speed that could be secured by direct connection of the sprocket-wheels with the shaft.

Two nuts 92 Fig. 3 fit upon the flanges 89 and an internally flanged arm 95 is seated upon and held in place on one of said flanges by one of said nuts and the rod 61 extends from the arm 95 to the lever or wrist-plate 52 and thereby controls the brake mechanism. The brake-lever 52, which, by means hereinafter stated, is connected to and operates the lever 53, is adapted to be oscillated by one of the handle grips 5 through a flexible shaft 96, in the handle bar, a head lever 97, a rod 98, a bell-crank lever 99 and a rod 100. The inner end of the flexible shaft is angular and fits in a corresponding hole in the lever 97 so that when the grip is rotated the outer end of the lever will be moved up or down and motion transmitted through the rods to set or release the brake, as the case may be. The crank-lever 99 is mounted on a stud 101 which projects from or is rigidly secured to the side of the head or fork post of the frame. Swivel heads 102 are preferably provided for connecting the rod 98 with the levers 97 and 99 respectively. The other handle grip 5 is connected in a similar manner with a head lever 103 that controls the fuel supply 104, Figs. 1 and 30, through rod 105, bell-crank lever 106, and rod 107, the lever 106 being mounted in the same manner as lever 99 and the rod 105 being connected at its ends by means of swivel heads the same as rod 98. The rod 107 connects with and extends from the bell-crank lever 106 to and connects with the lever 124 by which the fuel supply 104, Fig. 29, is controlled. The handle-bars at their meeting ends 108 are fixed by screwbolts 109 to the steering post and the central portion of the bars is cut out to form a hollow central space open at the front side of the post and through which hollow the upper end of the steering-post passes and through which open space the levers 97 and 103 project in positions to be connected to the bell-crank levers 99 and 106 mounted on the post. The advantage of this construction is the compact, convenient and durable arrangement upon the steering post of the mechanism for controlling the fuel-supply, the sparking-device, and the brakes and in which one of the handle bars forms the means of controlling the fuel-supply and the other handle-bar the means for controlling the sparking-device and the brake mechanism. For this purpose each handle-bar has a flexible shaft the end of each terminating in the handle-space which is provided to allow the arms 97 and 103 to be fixed to each end of the flexible shaft to stand out side by side, and from the end of each a rod depends by the side of the post and is connected to one end of an arm of a bell-crank-lever mounted on each side of the post near its fork connection, the other arm of each bell-crank lever being connected—one by a rod which controls the fuel supply and the other by a rod which controls the brake and the sparking devices, so that all the connections are made to give a direct thrusting force from each flexible shaft and thereby prevent lost motion of the operating connections; and to render the handle arms, and the bell-crank levers free from binding or cramping they are connected to the depending rods by swivel-heads or links so that each flexible shaft will have a quick and certain action upon their connections.

Seated within the lower part of the frame 1 immediately in front of the seat post and adjacent to the pedal mechanism, is a tank 110 for oil which communicates with the motor mechanism through a pipe 111 and reservoir 112. A tank 113 for fuel, as gasolene, is mounted within the frame 1 between the top of the tank 110 and the top bar of the frame and communicates with the carbureter 114 through a valved pipe 115. The lubricating oil is preferably fed under air pressure which is supplied through an opening 116 in the tank 110 by an ordinary hand pump, (not shown), and the tank 113 is filled through an opening 117.

The seat is mounted at the rear ends of two springs 119 that are located upon opposite sides of the frame and are pivotally connected at their forward ends to the ends of two other springs 120 by links 121. Blocks 122 separate the intermediate portions of the springs and the rear ends of the lower springs 120 are pivotally connected with the seat post as shown at 123.

At their front ends the upper pair of springs are connected each to a stud on each side of the frame head and to these studs the upper ends of the links 121 are also connected, so that the upper and lower springs of each pair are connected and supported on each side of the top frame-bar and their rear ends to the opposite sides of the frame. The links 121 are in pairs on each side of the frame and connect and serve as spreaders for the front ends of the springs, so that the weight of the rider is carried by the rear half of the upper pair of springs 119, the middle block and the stud connections at the front ends of the upper springs and the stud connections of the rear ends of the lower pair of springs.

By constructing a motor cycle as above described the greatest weight is placed directly over the point of contact of the driving wheel with the ground whereby the most effective traction effects are secured and the machine can be driven at the greatest possible speed. The excessive strain is taken off the frame and the space within the driving wheel is utilized for the motor which affords a greater space within the frame for fuel and oil. The machine is under absolute control at all times and its speed can be varied or stopped by manipulating the hand grips without letting go of the handle-bars. All sudden jars from the driving mechanism are taken up in friction without being transmitted to the supporting wheels. The seat is so yieldingly but firmly supported that the rider is not inconvenienced nor is the seat broken by the jar caused by passing over comparatively rough roads at a very high rate of speed.

The adjusting means for maintaining the proper working of the driving roller are shown in Figs. 1, 15 and 28 and for a better understanding of this adjustment it may be stated that the slots 30 in the clips 28 are for the purpose of adjusting the driving roller for taking up the slack of the chains 9 and 35 which lengthen or stretch by wear of their links, blocks and pins in transferring power from the motor to the driving-roller and from the treadle to the driving-roller. For instance, should the slack of the chains become so great that the extreme rear position of the bolt 26 in the slot 30 as in Figs. 1 to 28 may be necessary to take up the entire slack, the bolts 26, are then loosened and the eccentrics are adjusted to move the driving-roller arrangement 26 to the extreme forward ends of the slots, to remove one or two links in each of the chains. To move the driving-roller forward is to move the wheel with its ring-frames 12 and the motor as an entirety in the same direction by properly actuating the eccentrics as shown in Fig. 33. The center of the yoke-arms 7 is the center of the ring-frames 12 and also of the traction-wheel. If therefore, the center of the yoke and the centers of the eccentrics be in line vertically, the driving roller arrangement 26 will assume a position in the middle of the length of the slot 30 as in Fig. 34. Referring to Fig. 1 it will be seen that the brace arms 11 which connect the main frame arms with the ring-frames 12 serve as tie-bars of fixed length between the centers of the yoke-arms and the center of the wheel supporting roller rings at the front ends of the frame arms, and that any adjustment of the driving-roller arrangement 26 and the eccentrics 67 either forwardly or rearwardly will not affect the contact of the rollers of the ring frames with the web of the traction wheel. Therefore, the mechanical adjustment of the above members for the purpose of adjusting the chains 9 and 35 is effected by the construction described, but such adjustment of the driving roller cannot be and is not intended to be made independent of the eccentrics. The bearings for the eccentrics are formed in the socketed arms rigidly fastened to the ends of the frame as in Fig. 35; while in Figs. 25, 35 and 36, the eccentrics 67 are seen mounted in pairs one upon the yoke-arms 7 and the other upon the bolt and are secured to each side of an annular fillet 67ª, of the arms.

It is important that the driving-roller be firmly and durably mounted and for this purpose each end is fixed tightly within openings in the rings 12 and upon the periphery of the ball-bearing cups 43, which are fixed members of the roller, the shoulders 44, of said ball-bearing cups, abutting on the outside of the rings which are enlarged at the openings within which the roller is fixed, as in Figs. 1 and 28. The driving roller therefore, is not only firmly fixed in the wheel supporting frame of which the rings are members, but is also firmly fixed by its bolt or axle upon the arms of the main frame and the nuts on the ends of the bolts, so that when the driving roller is set with its spurs in engagement with the wheel-flange, it is fixed in such adjustment by the axle nuts. The engagement of the driving-roller at the inner front side of the wheel on a horizontal radial line causes the pulling force of the sprocket chain to maintain the driving-roller firmly against the flange of the wheel and renders certain the automatic engagement of the spurs of the driving-roller as it rotates, with the perforations in the flange of the wheel. While the machine may be propelled by the treadle mechanism, it will be understood that the importance of the treadle is to start the machine as well as the motor and thus serve to reduce the jerky action in starting the motor.

I have stated that the motor transmits its power through the sprocket and chain 9, and referring to Fig. 1 it will be seen that this chain is the connection between the driving roller and the motor, and in making such connection the chain passes around the pedal sprocket wheel 90 Fig. 3 and also around the motor sprocket wheel and over and engaging the driving roller sprocket wheel 32, Fig. 24.

I have shown in Fig. 28 so much of the sparking mechanism as illustrates its operating connections and in which the lever 53, on the driving roller, is seen connected by the link 55 with the sparking device, and the brake-lever 52, is seen connected by the rod 61, with the arm 95, which has the action of a bell-crank and forms the intermediate connection for the rods 61 and 100, between the brake-lever 52, and the grip-control of the handle connections.

It is important to note that the mounting of the driving roller at the side of the traction-wheel in a line approximately coincident with the horizontal radius thereof, gives the advantage of operating the driving-roller with an easy starting and driving operation in propelling the machine, and for this purpose the shaft of the driving roller is mounted in the rings and in the frame arms and causes thereby the steady support and running of the traction-wheel, because the position of the driving-roller is such as to relieve it of the weight of the operating elements within the wheel. It is also important to note that all the driving elements are supported within the traction-wheel upon a horizontal central-ring which connects and braces the rear arms of the frame and that the wheel is rotated around this ring upon friction-rolls mounted upon and between a pair of vertical rings one on each side of the wheel and supported between and by the arms of the frame thus forming a bracing structure for the wheel and its driving elements, and whereby the driving-roller may be operated by a treadle operated chain so that the wheel may be driven by motor power, by treadle power, or by both for propelling the machine.

In the attainment of the objects sought by my improvements I do not wish to be limited to the precise details herein set forth, inasmuch as minor changes in the form, proportions, and exact manner of assemblage of the parts may be made without departing from the spirit of the invention.

I claim:

1. In a motor cycle, a wheel-supported frame, a motor, the traction wheel, a friction drum, a band around the drum provided with means for engaging with said wheel, and friction means connected with the motor and engaging the drum.

2. In a motor cycle, a wheel supported frame, a motor, the traction-wheel, a spurred-band, rotating friction-members, a sprocket-wheel for driving the rotating members, means for engaging the traction wheel with the spurred-band, means for engaging the spurred band with the rotating members, and means for driving said rotating friction members by foot or by motor power.

3. In a motor cycle, a frame, wheels therefor one of which is provided with an internal annular perforated flange, a motor in said wheel, a driving-roller connected with said motor and provided with an annular band, spurs seated in said band and adapted for engaging with the perforations of said flange.

4. In a motor cycle, a frame, wheels therefor one of which is annular and provided with an internal annular perforated flange, a seating perforated band or strip of fiber for said flange, a motor in said wheel, and a driving-roller connected with the motor and provided with spurs projecting through the perforations of the band and the flange.

5. In a motor cycle, a frame, wheels therefor one of which is annular and provided with an internal annular perforated flange, a perforated band of fiber for said flange, a motor in said wheel, a driving-roller comprising a shouldered circumferential band and an annular shouldered shell in positive engagement therewith, and driving-means connected with the motor and engaging with said shell by frictional contact only, said driving-roller having spurs which project through the perforations of the band and flange.

6. In a motor cycle, a frame, supporting wheels therefor one of which is the traction wheel, a pair of rings one on each side of the traction wheel, roller bearings mounted upon and between said rings in contact with the inner web of the wheel, a motor within said wheel, a roller mounted upon said rings in driving engagement with the wheel, brake mechanism mounted upon the driving-roller, means for controlling said brake mechanism, and means connecting the motor and the driving-roller for propelling the machine.

7. In a motor cycle, a frame, supporting wheels therefor the rear wheel having an internal web, a pair of rings one on each side of the wheel, roller bearings mounted upon and between said rings in contact with the wheel-web, a motor within the wheel, a driving-roller mounted upon and between said rings in driving engagement with said wheel-web, a brake on each end of said driving-roller, a lever connected with each brake, operating connections for each lever, one of said connections controlling the motor, the other of said connections controlling the driving-roller, and means mounted on the frame for controlling said connections.

8. In a motor cycle, a frame its rear arms provided each with a clip, wheels for the frame one of which is annular, a motor, a driving-roller, connected with the motor, and mounted in said clips, a ring fixed on each end of said roller, flanged-rollers mounted upon and between the rings for engaging and supporting said wheel, and means for adjusting said roller upon said clips.

9. In a motor cycle, a wheel supported frame, a traction wheel, a pair of rings one on each side of the said wheel, bearing rollers mounted upon and between said rings for supporting said wheel, a pair of braces one on each side of said wheel connecting the frame arms with the rings at the rear of the wheel, a motor and a driving-roller both supported upon the frame, means connecting the motor and the driving-roller, and means for positively engaging the circumference of the roller with the wheel-web.

10. In a motor cycle, a frame, wheels therefor one of which is annular, a ring on each side of the said wheel fixed to said frame supporting said wheel, a motor provided with sparking mechanism, braces from the rear of the frame to the rear side of said rings, and a magneto generator mechanism mounted upon the braces.

11. In a motor cycle, a frame, wheels therefor one of which is annular, a ring on each side of the said wheel fixed to said frame bearing rollers mounted in said rings and supporting said wheel, a motor provided with sparking mechanism, braces from the rear of the frame to the rear side of said rings, a magneto generator mechanism mounted upon said braces, the armature of which is adapted to engage with one of the bearing rollers.

12. In a motor cycle, a frame, wheels therefor the rear one of which is annular, adjustable eccentric disks in the rear ends of the frame, a ring on each side of the rear wheel, provided with rollers engaging the web of said wheel, and braces connected with the eccentrics and to the rings and forming tie-bars for the connected parts.

13. In a motor cycle, a frame, wheels therefor, the rear one of which is annular, a motor within said wheel provided with sparking mechanism, a driving roller connected with the motor and engaging with said wheel for propelling the machine, and a brake for said roller provided with means for controlling said sparking mechanism.

14. In a motor cycle, a wheel frame, a driving-roller, a motor for said roller provided with a sparking mechanism, and brake mechanism on said roller provided with two levers one of which is adapted to control the sparking mechanism.

15. In a motor cycle, a frame, wheels therefor one of which is annular, a driving-roller for said wheel, a motor for said driving-roller provided with speaking mechanism, and a brake adapted for engagement with said driving roller and provided with means for controlling the sparking mechanism.

16. In a motor cycle, a frame, wheels therefor the rear wheel provided with an internal web having perforated flange, a driving-roller mounted within said wheel, a spurred band mounted upon said roller and adapted to engage the perforated web flange, rolling supports for the wheel mounted therein, braking means mounted upon and controlling the driving-roller, sparking mechanism, means operatively connecting said braking means with the sparking mechanism, the handle-bars, and means connecting said braking mechanism with actuating means therefor connected with the handle-bars.

17. In a motor cycle, a frame, wheels therefor the rear one of which is annular, a motor, a pair of rings one on each side of the rear wheel and provided with rollers for supporting said annular wheel, a driving-roller connected with the motor and mounted upon and between said rings, two levers mounted on said driving-roller one of which controls the motor, brakes one mounted on each end of the driving-roller and rendered operative by the other lever for engagement with said driving-roller, and means for operating said levers.

18. In a motor cycle, a frame, wheels therefor the rear one of which is annular, a motor, a pair of rings one on each side of the rear wheel and provided with means for supporting said wheel, a driving-roller connected with the motor and mounted upon and between said rings, two levers one mounted on each end of said roller, one of which is adapted to control the motor, brakes one mounted on each end of the driving-roller and rendered operative by the other lever for engagement with said driving-roller, each brake being provided with a slotted ear for free engagement with the brake operating lever.

19. In a motor cycle, a frame, supporting wheels therefor one of which is provided with an annular internal perforated flange, a plurality of rollers having contact with said flange for supporting said wheel, means fixed on the frame supporting said rollers, a driving-roller having a circumferential spurred band the spurs whereof being adapted to engage the perforations in said wheel flange, a sprocket-wheel on each end of the driving roller, a motor provided with a sprocket-wheel, pedal mechanism having a pair of sprocket-wheels and a driving chain for each, one of which chains connects the sprocket-wheel of the motor with one of the sprocket-wheels of the driving-roller and the pedal mechanism, and the other chain connects the other sprocket-wheel of the driving-roller with the pedal mechanism.

20. In a motor cycle, a frame, wheels therefor one of which is provided with an annular internal perforated flange, rollers mounted on the frame and having contact with said flange for supporting said wheel, a motor within the wheel, a driving-roller within said wheel, a circumferential band upon said driving-roller, and having a plurality of spurs adapted to engage the perforations in said wheel-flange, one edge of said spurred-band provided with shoulders, and an annular friction-shell encircled by said spurred band and having shoulders adapted to engage the shoulders of the spurred-band, and means for connecting the motor and the driving-roller for operation in the way and for the purpose stated.

21. In a motor cycle, a frame, wheels therefor one of which is annular and provided with an annular internal perforated flange, a bearing support of rolls for said wheel, a spurred driving-roller the spurs whereof being adapted for engagement with the perforations of said wheel-flange, a motor for driving said roller, a pair of brakes one on each end of the driving-roller, a lever connected with each brake one of which levers is adapted to control by connections both brakes simultaneously, the other of said levers controlling the sparking-mechanism, and means for operating said levers.

22. In a motor cycle, a wheel-supported frame, a traction wheel, a motor, a sparking device therefor, and a driving-roller within the said wheel, means for operatively connecting the motor and the driving-roller, a pair of brakes one upon each end of the driving roller, a pair of levers one operatively connected with each brake, a pair of rings one on each side of the wheel, a pair of wrist-pins pivotally connecting the levers, a sleeve connecting and bracing the wrist-pins whereby to effect the simultaneous operation of the levers and their connected brakes, roller-bearings for the wheel mounted in the rings, rotatable handle-grips, means connecting one of said grips with the operating lever of one of the brakes whereby to control both pairs of brakes, and the other lever for controlling the sparking-device.

23. In a motor cycle, a wheel-supported frame, a traction wheel, a motor within the said wheel, a driving-roller within said wheel, a treadle-device, a sprocket-wheel on the motor, a sprocket-wheel on the driving roller, a sprocket-wheel on the treadle, a chain connecting the motor, the driving-roller and the treadle-device, a pair of brakes one on each end of the driving-roller, a pair of levers connected to and adapted to operate the brakes, a sparking-device, a link connecting one of said levers with the sparking device, means for connecting the separate brakes for effecting their simultaneous movement, a swing-arm on the treadle-device, a rod connecting the swing-arm with the lever of one of the brakes, rotatable handle-grips, and means for connecting one of them to the treadle swing-arm for operation in the way described.

24. In a motor cycle, a wheel supported frame, a traction wheel, a motor within the wheel, a driving-roller adapted for positive engagement with the said wheel, means connecting the motor and the driving-roller, a lever mounted on a fixed part at each end of said driving-roller, a brake pivotally mounted on each lever, means for connecting the brakes for simultaneous movement upon the roller, a sparking device, means for connecting it with one of said levers, rotatable handle-grips, and means for connecting one of said grips with the other of said levers, whereby the brakes and the sparking device are simultaneously operated.

25. In a motor cycle, a wheel supported frame, a traction wheel, pedal mechanism a motor, and a driving-roller both mounted within the said wheel, an internal frame upon the main frame adapted to support said wheel, the motor, and the driving-roller, a driving chain connecting the motor and the treadle, and a driving chain connecting the treadle and the driving roller.

26. In a motor cycle, a wheel supported frame, a traction wheel, a yoke transversely connecting the rear ends of said frame, an internal frame comprising a pair of rings, roller-bearings mounted between them adapted to support the said wheel, braces connecting the ring frame and the yoke, a motor, and a driving-roller, treadle mechanism, and driving means connecting the motor and driving-roller with the treadle mechanism, the motor and the driving-roller; the yoke, the internal frame and the braces being mounted in coöperative relation within the said wheel and upon the frame.

27. In a motor cycle, a wheel-supported frame having rear extension braces, a traction wheel an internal frame for supporting the said wheel mounted upon the main frame and consisting of a pair of rings one on each side of said wheel, transverse rollers connecting the rings and forming bearing supports for said wheel, a driving roller mounted between and upon the rings, means for adjusting the wheel, its roller bearing supporting frame and the parts carried thereby in their relation to the frame, treadle mechanism, and driving means connecting the motor and the driving-roller with the treadle.

28. In a motor cycle, a wheel-supported frame, a traction wheel, a motor in the said wheel, a driving-roller within said wheel having means for positively engaging the inner periphery of said wheel to drive it, a pair of brakes one on each end of said driving-roller, and means connecting said brakes for controlling the driving-roller.

29. In a motor cycle, a frame, supporting wheels therefor, the rear wheel having a web provided with a flange, an internal supporting frame for said wheel having transverse rollers forming bearings over and upon which the wheel is driven, a driving-roller within the wheel, a band encircling said roller and provided with means for positively engaging the flange of the wheel for driving it, a motor within the wheel, and means for operating said motor for causing the rotation of the driving-roller its encircling band and its connected wheel.

30. In a motor cycle, a frame, wheels therefor one of which is provided with a web having a perforated flange, a fixed roller bearing support for said wheel, a motor in said wheel, a driving-roller connected with the motor, and a band on said driving-roller having spurs in registering relation to the perforations in the web flange and engaging therewith for driving the wheel.

31. In a motor cycle, a forked-frame, wheels therefor the rear wheel supported within the fork, an extension brace connected to and extending from the end of each fork of the frame, a pair of rings one on each side of the wheel, rollers connecting the rings and forming a bearing support for the wheel, a driving-roller connecting the rings and the forks of the frame, eccentric disks connecting the frame forks and the braces, and slotted bearing supports for the driving roller fixed on the frame-forks, whereby the wheel is adjusted in its relation to the frame, and means connecting the motor and the driving-roller, treadle mechanism, and driving means connecting the driving-roller and the treadle, substantially as described for the purpose specified.

32. In a motor cycle, a forked-frame, wheels therefor the rear wheel supported upon and within the fork, an extension brace connected to and extending from the end of each fork of the frame, a pair of rings one on each side of the wheel, rollers connecting the rings and forming a bearing support for the wheel, a driving-roller connecting the rings and the forks of the frame, means connecting the motor and the driving-roller, treadle mechanism, means for adjusting the wheel in its relation to the frame, and driving chains connecting the driving-roller and the treadle.

33. In a motor cycle, a forked-frame, wheels therefor the rear wheel supported within the fork, an extension brace connected to and extending from the end of each fork, a frame having roller bearings for supporting the wheel mounted upon the forks and the braces, a motor, a driving-roller and means for connecting them mounted in the wheel, treadle mechanism and driving chains connecting the driving-roller and the treadle, and means mounted on the fork ends and connecting the wheel supporting frame whereby the wheel with its contained operating members is adjusted toward the front and toward the rear upon the frame forks in the way and for the purpose stated.

34. In a motor cycle, a wheel-supported frame, a motor, the rear wheel, a driving roller within said wheel and comprising an axle, wedge shaped friction members, an encircling band therefor, means connecting said band with said friction members, means connecting said band with the wheel, means for connecting the motor and the roller, and means for supporting said driving-roller in contact with said wheel.

35. In a motor cycle, a frame, wheels therefor one of which is annular, a motor and a driving-roller mounted therein, and driving-means connecting them, an internal wheel supporting frame comprising a pair of rings, one on each side of the wheel, roller-bearings in the rings upon which the wheel is caused to rotate, and means for rigidly connecting said internal frame with the main frame, the said driving-roller being fixed at each end to and within said rings, and fixed by its axle upon the main frame, and means for positively engaging the driving roller with the wheel.

36. In a motor cycle, a frame, wheels therefor one of which is the traction-wheel, pedal-mechanism, a roller in positive driving engagement with the traction-wheel, a motor, and driving means connecting a driving element of the motor with the driving-roller and with the pedal, and driving means connecting the pedal with the driving-roller.

37. In a motor cycle, a frame, supporting wheels therefor, a traction wheel, a yoke and means for clamping it to the arms of the frame, a motor mounted on said yoke, a pair of braces one forming an extension of each frame-arm, a pair of rings one on each side of said wheel and mounted on said braces and on said frame-arms, rollers mounted in said rings for supporting the traction-wheel, a driving roller mounted upon and between the rings in a line approximately co-incident with the horizontal radius of the wheel, and means for connecting the motor and the driving-roller.

38. In a motor cycle, a wheel supported frame, an internal frame supporting one of said wheels and consisting of a pair of rings one on each side of said wheel, flanged rollers mounted between and upon said rings, the said rings each fixed at diametric points upon said frame, and means for rotating said wheel.

39. In a motor cycle, a wheel supported frame, a traction wheel, a motor and a driving roller both within the said wheel, means for supporting the driving-roller at the inner vertical front side of the wheel, means providing an interlocking engagement of the driving-roller with the wheel-web, pedal mechanism a sprocket-wheel on the motor, a sprocket-wheel on the driving-roller, and a sprocket-wheel on the treadle device, and a chain connecting the motor, the driving-roller and the treadle for operating the driving-roller.

40. In a motor cycle, a wheel supported frame, a traction wheel, a motor and a driving-roller within the said wheel, means connecting the motor and the driving-roller, a pair of brakes one on each end of the driving-roller, a pair of levers one for each brake, means for connecting the separate brakes, a sparking-device, a link connecting one of said levers with the sparking-device, handle-grips and means for connecting one of them with the other of said levers, whereby the separate brakes and the sparking-device are simultaneously operated.

41. In a motor cycle, a wheel supported frame, a traction wheel, a motor within the said wheel, a driving-roller in engagement by interlocking means with the inner periphery of the wheel, a chain driven by the motor and engaging said driving-roller, a lever 52 mounted on one end of the driving-roller, a brake on said lever and adapted to embrace said roller, a lever 53 mounted on the other end of said roller, a brake carried by said lever and adapted to embrace said roller, means for connecting both brakes whereby they are caused to be simultaneously operated—the lever 52 for applying and releasing both brakes, and the lever 53 for simultaneously controlling the sparking-device and thereby the motor, rotatable handle-grips and connections therefor with the brake-lever 52, whereby when said lever is moved in one direction the brakes will be set to check or stop the speed of the cycle and simultaneously therewith operate the lever 53 to disconnect the sparking-device of the motor to stop its action, the opposite direction of the lever 52 causing the brakes to be released and the sparking-device again thrown into action.

42. In a motor cycle, a wheel-supported frame, a traction wheel, a motor within the said wheel, a driving-roller in positive engagement with the wheel, driving means connecting the motor and the driving-roller, a lever mounted on one end of the roller, a brake on said lever and adapted to embrace said roller, a brake mounted on the other end of the roller, means for connecting the brakes for causing their simultaneous operation, a rod connected to said lever, and rotatable handle-grips and connections thereof with said rod, whereby both brakes are applied and released in the way described.

43. In a motor cycle, a wheel supported frame, a traction wheel, a motor within the said wheel, a driving-roller in positive engagement with the wheel, means engaging the motor and the driving-roller, a sparking-device, a lever 52 mounted on one end of the roller, a brake on said lever and adapted to embrace the roller, a lever 53 mounted on the other end of said roller adapted to control the sparking device, a brake on said lever embracing the roller and means for connecting the brakes whereby they are caused to be simultaneously operated—the lever 52 for applying and releasing both brakes and the lever 53 for simultaneously controlling the sparking-device and thereby the motor.

44. In a motor cycle, a wheel supported frame, a motor, a driving-roller, a sparking-device, brake mechanism mounted on one end of said driving-roller, a lever on one end of said driving-roller for operating the brake, a lever on the opposite end of said driving-roller including its connected link for operating the sparking-device, means for connecting the motor and the driving-roller, and means for operating said levers.

45. In a motor cycle, a wheel supported frame, a motor, a driving-roller, means for connecting the motor and the driving-roller and a brake mechanism mounted on the roller, a frame for supporting said driving-roller connected to the main frame and consisting of a pair of arms, a pair of rings each having fixed connection with the arms and tied thereby to the frame, and rollers mounted on said rings in engagement with and supporting the traction-wheel.

46. In a motor cycle, a wheel supported frame, a motor, a driving-roller and means for connecting the motor and the driving-roller, a sparking-device, and a brake mechanism mounted on the roller, a lever loosely mounted on one end of the driving-roller for operating the brakes, a lever loosely mounted on the opposite end of the driving-roller, and means on said rollers for connecting said levers whereby they are caused to be operated simultaneously, means for connecting the other of said levers with the sparking-device, and means under the control of the rider for connecting and operating the brake-lever, whereby the brake and the sparking-devices are operated simultaneously.

47. In a motor cycle, an annular wheel, a forked-frame, a pair of bracing arms one mounted upon and extending from each end of the forked-frame, a horizontal yoke centrally mounted on the frame-forks within the annular wheel, a roller bearing support for said wheel, a motor and a driving-roller, and means for connecting them, the roller bearing-support fixed upon the bracing-arms and the frame, and the driving-roller mounted upon the main frame in engagement with the inner front side of the wheel.

48. In a motor cycle, a wheel supported frame, a traction wheel, having a perforated web, a motor within the said wheel, a roller-bearing support for said wheel fixed upon the main frame, a driving roller in said support, the said driving-roller comprising a fixed bolt or axle, a pair of sprocket-sleeves thereon, a union screw-sleeve connecting the sprocket-sleeves, and external ball-bearing cups constituting the fixed roller members, and rotating members consisting of a beveled friction drum upon said union sleeve, a pair of friction cones upon said friction drum, a beveled friction-shell upon the friction-cones, a band upon said shell, spurs carried by said band adapted to engage perforations in the web of said traction wheel the spurred band and the friction-shell having interlocking engagement on the surface of the shell whereby to cause the rotation of said spurred band, the friction-shell and the friction-drum having interlocking engagement between the ends of the friction-cones, and means connecting one of the sprocket-sleeves with the motor, a pedal sprocket mounted upon the wheel supported frame and means connecting the other sprocket sleeve with the pedal sprocket.

49. In a motor cycle, a wheel supported frame, a traction wheel, a motor and a driving-roller both within the said wheel, means for operatively connecting the motor and the driving-roller, a brake-device mounted upon the driving-roller, a rotatable handle-grip, and means for operatively connecting it with the brake-device whereby the speed of the driving-roller is controlled.

50. In a motor cycle, a wheel supported frame, a traction wheel, a motor and a driving-roller both within the said wheel, means for operatively connecting the motor and the driving-roller, a sparking-device for the motor, a brake-device mounted upon the driving-roller, means connecting the brake-device with the sparking-device, a rotatable hand-grip, means for operatively connecting it with the brake-device, whereby the speed of the driving-roller is controlled simultaneously with the control of the sparking-device and the motor.

51. In a motor cycle, a forked wheel supporting frame, a yoke between and connecting the forks of the frame, a traction wheel, a pair of rings one on each side of the wheel and mounted upon said frame-forks, roller-bearings mounted upon said rings for supporting said wheel, a motor, and a driving-roller, means connecting them within the wheel, means for supporting them upon the frame forks, and means on the periphery of said driving-roller adapted for interlocking engagement with the inner periphery of the wheel.

52. In a motor cycle, a wheel supported frame, a traction wheel, a motor and a driving-roller both within the said wheel, a roller-bearing support for said wheel fixed upon the frame, and the said driving-roller comprising fixed and rotatable friction members of which the central bolt or axle is a fixed member and the circumferential band a rotating member, means fixed thereon adapted for interlocking engagement with the inner periphery of the wheel, rotatable friction members within the roller, and means connecting said friction rotatable members with the motor.

53. In a motor cycle, a wheel supported frame, a traction wheel, a motor and a driving-roller both within the said wheel, a band having spaced projections on the circumference of the roller, and corresponding means on the inner periphery of the wheel whereby to effect the interlocking engagement of the roller with the wheel, means mounted within the roller adapted for frictional engagement whereby to cause the rotation of the roler, and driving means connecting the roller and the motor.

54. In a motor cycle, a wheel supported frame, a traction wheel, a motor and a driving-roller both within the said wheel, means on the circumference of the driving-roller and means on the inner periphery of the wheel whereby an automatic interlocking engagement of the roller and the wheel is effected, and friction mechanism within the roller whereby it is caused to be rotated, and driving means connecting the roller and the motor.

55. In a motor cycle, a wheel supported frame, a traction wheel, a motor and a driving-roller both within the said wheel, said driving-roller having a circumferential toothed member adapted for interlocking engagement with the inner periphery of the wheel, and said roller also having interior rotating friction members, means for interlocking the rotating friction members with the circumferential toothed member, and driving means connecting the motor and the roller.

56. In a motor cycle, a wheel supported frame, a traction wheel, a motor and a driving-roller both within the said wheel, said driving roller having fixed and rotating members, the fixed members comprising a mounting bolt or axle, ball-bearing sleeves thereon, a union bushing externally connecting said sleeves; the rotating members comprising the friction cones 38—39, the bushing sleeve 36 to which the cones are screwed, the shell 40 upon the cones, the bushing 37 upon the sleeve 36 and keyed to said shell, the ball-bearing sleeves 31—31 screwed upon the bushing 36, the sprocket-wheels upon the sleeves 31, and a toothed band around the shell and adapted for engagement with the inner periphery of the wheel, and driving-means connecting the sprocket-wheel with the motor.

57. In a motor cycle, a wheel supported frame, a traction wheel, a motor and a driving-roller both within the said wheel, means for connecting the motor and the driving-roller, an internal roller bearing support for the wheel fixed upon the frame, bearings on the latter having slots within which the roller is mounted, an eccentric on the main frame at each side of the wheel, means connecting the eccentrics with the internal roller-bearing frame, whereby the traction wheel, its internal supporting frame, the motor, and the driving-roller may be moved as an entirety upon the main frame toward the front or toward the rear, the treadle mechanism, and driving chains connecting said treadle mechanism with the driving roller and the motor.

58. In a motor cycle, a wheel supported frame, a traction wheel, a motor and a driving roller both within the said wheel, an internal roller bearing wheel supporting frame mounted upon the main frame and supporting said traction wheel, friction engaging rotating members within the driving-roller, means connecting the motor and the rotating members of said roller, and means connecting the rotating members of the roller with the traction wheel.

59. In a motor cycle, a wheel supported frame, a traction wheel, a motor and a driving-roller both mounted within the said wheel, an internal roller bearing frame for supporting said wheel, the motor and the driving-roller mounted upon the main frame, and means for connecting the motor and the driving-roller, and adjustable means connecting the internal frame with the wheel supporting frame, whereby the traction wheel, the driving-roller and the motor may be moved together forward or backward without changing the relation of the driving-roller with the traction-wheel.

60. In a motor cycle, a wheel supported frame, a traction wheel, a motor within the said wheel, an internal wheel-supporting frame mounted upon the main frame, a driving-roller mounted upon the latter and consisting of the following members, a bolt or shaft, a ball-bearing sleeve on each end thereof, a union bushing screwed upon the ends of said sleeves, and the ball-bearing cups 43 at each end of the roller, the said members having fixed relation to each other and to the internal wheel supporting-frame, and the following rotating members, the bushing 36, the friction cones 38—39 screwed externally upon each end of the bushing 36 and forming a shell seating for the ball-bearing cups 43, the friction shell 40, corresponding in form and fitted upon the outer walls of the friction cones, the segmental double conical friction bushing 37 corresponding with and fitted upon the inner walls of the friction-cones the shell 40 and the bushing 37 keyed to each other between the ends of the friction cones, and the ball-bearing sleeves 31—31, screwed internally upon each end of the bushing 36, the sprocket-wheels 32—34 fixed upon the outer ends of said ball bearing sleeves 31, and forming through said wheels a frictional connection to the driving-roller, the band 47 mounted upon the shell 40 and having spurs in engagement with the web of the traction wheel, and means for securing said band to the shell, whereby the power of the motor is transmitted to the traction wheel.

In testimony whereof I have signed my name to this specification in the presence of two subscribing witnesses.

FLOYD FITZ-TARR BINGHAM.

Witnesses:
KATH. T. BINGHAM,
HERBERT C. JONES.